US012115807B2

(12) United States Patent
Parker et al.

(10) Patent No.: US 12,115,807 B2
(45) Date of Patent: Oct. 15, 2024

(54) APPARATUS FOR LOADING BINDER STRIPS INTO A BINDING MACHINE

(71) Applicants: Kevin P. Parker, Berkeley, CA (US); Thomas M. Young, Richmond, CA (US)

(72) Inventors: Kevin P. Parker, Berkeley, CA (US); Thomas M. Young, Richmond, CA (US)

(73) Assignee: POWIS PARKER INC., Berkeley, CA (US)

( * ) Notice: Subject to any disclaimer, the term of this patent is extended or adjusted under 35 U.S.C. 154(b) by 0 days.

(21) Appl. No.: 18/126,730

(22) Filed: Mar. 27, 2023

(65) Prior Publication Data

US 2023/0264507 A1 Aug. 24, 2023

Related U.S. Application Data

(62) Division of application No. 17/514,490, filed on Oct. 29, 2021, now Pat. No. 11,667,143.

(51) Int. Cl.

*B42C 9/00* (2006.01)
*B42C 5/04* (2006.01)
*B42C 13/00* (2006.01)

(52) U.S. Cl.

CPC .............. *B42C 5/04* (2013.01); *B42C 9/0056* (2013.01); *B42C 13/00* (2013.01); *B65H 2301/43827* (2013.01); *B65H 2301/44734* (2013.01); *B65H 2301/51132* (2013.01)

(58) Field of Classification Search

CPC .................. B42C 9/0056; B65H 37/04; B65H 2301/43827; B65H 2301/44734; B65H 2301/51132; B65H 3/20; B65H 35/0046

USPC .......................................................... 412/36

See application file for complete search history.

(56) References Cited

U.S. PATENT DOCUMENTS

| | | | | | |
|---|---|---|---|---|---|
| 3,911,517 | A * | 10/1975 | Davis | B42C 9/0062 | 412/37 |
| 3,946,919 | A * | 3/1976 | Ernst | B42C 9/0062 | 226/34 |
| 5,052,873 | A * | 10/1991 | Parker | B42C 9/0056 | 412/37 |
| 7,217,075 | B2 * | 5/2007 | Kenji | B65H 35/0013 | 412/37 |
| 2001/0042952 | A1 * | 11/2001 | Coombs | B65H 31/3018 | 270/52.18 |
| 2006/0266872 | A1 * | 11/2006 | Parker | B65H 35/006 | 428/343 |
| 2009/0188631 | A1 * | 7/2009 | Noh | G03G 15/6544 | 156/459 |

* cited by examiner

*Primary Examiner* — Kyle R Grabowski
(74) *Attorney, Agent, or Firm* — Philip A. Girard

(57) ABSTRACT

Apparatus for loading heat-activated adhesive binder strips into a binding machine where the loaded binder strip is utilized to bind a stack of sheets. A support arm with an attached thermal head is temporarily secured to the adhesive of a binder strip located external to the binding machine. The attached strip is transported into the binding machine and the released so that the strip can be used to carry out a binding operation. The thermal head temperature is controlled to levels above and below the adhesive melting point to accomplish securing and releasing the strip.

19 Claims, 12 Drawing Sheets

APPARATUS FOR LOADING BINDER STRIPS INTO A BINDING MACHINE

BACKGROUND OF THE INVENTION

1. Field of the Invention

The present invention relates generally to the field of book binding and in particular to apparatus for loading adhesive binder strips into a book binding machine.

2. Description of Related Art

Bookbinding apparatus have been developed which permits a stack of sheets to be bound into a book form using thermally activated adhesive binder strips. An exemplary binding apparatus is disclosed in U.S. Pat. No. 5,052,873 entitled APPARATUS AND METHOD OF BINDING A BOOK (hereinafter the '873 patent), the contents of which are fully incorporated herein by reference. As disclosed in the '873 patent (FIGS. 1 and 3, e.g.), a stack of sheets 36 can be bound using desk top machine which receives the stack 36 to be bound using a binding tape 36 which carries a heat activated adhesive. Note that the present application will use the term "binder strip" herein in place of "binding tape", with both terms intended to have the same meaning. This approach has proven to be very successful. However, certain types of sheets resist reliable binding due to various coatings present on the exterior of the sheets. By way of example, the toners used in copying photographs sometimes prevent the binder strip adhesive from reliably adhering to the edges of the sheets to be bound.

Various approaches have been used to address the above-noted adherence problem. By way of example, U.S. Pat. No. 7,677,855 (herein after the '855 patent) discloses a conditioning apparatus which conditions the edges of the sheets so as to increase adhesion. The contents of the '855 patent are fully incorporated herein by reference. The '855 patent discloses one approach labeled "Prior Art" (see FIGS. 8 and 9 e.g.) which utilizes a relatively large reciprocating blade having several piercing elements or teeth 52*a* which are repeatedly driven into the binding end of the stack of sheets being conditioned. The '855 patent further discloses (FIG. 20) an additional step of compressing the conditioned end of the stack prior to binding resulting in a still further improvement.

The above-described approaches to stack conditioning approaches represented a significant improvement in binding stacks of sheets that possess coating that interfere with the binding process using heat-activated adhesive binder strips. However, problems remain. By way of example, the conditioning apparatus are relatively large and thus must be implemented separate from the binding machine. As a result, once a stack has been conditioned using such apparatus, the conditioned stack must be manually transferred to the binding machine. This creates an opportunity that the position or registration of the individual sheets relative to one another will be disturbed so that the subsequent binding will be less than ideal. Further, the previously described prior art approach inherently produce a significant amount of paper dust which tends to contaminate the binder strip adhesive thereby reducing the quality of the bind. Perhaps more importantly, the conditioning apparatus previously described has a tendency to severe many the paper fibers exposed during abrading. As a result, the molten binding adhesive has a reduced ability to secure the sheets of the stack.

In addition to the above-described binding issues, conventional binding machines typically require manual loading of individual binder strips into the binding machine. This is a particular problem when multiple books are to be bound requiring multiple strips to be manually loaded into the binding machine. The present invention addresses this shortcoming by providing apparatus that allows for automatic loading of binder strips, including multiple strips.

SUMMARY OF THE INVENTION

Apparatus for loading thermally-activated adhesive binder strips into a binding machine is disclosed. The apparatus includes a thermal head and associated thermal head controller which is configured to alter the temperature of the thermal head. The thermal head is mounted on a support arm having an associated positioner configured to move the support arm between a binder strip contacting position and a binder strip transport position. When in the contacting position, the thermal head can contact the adhesive located on a target binder strip to be loaded into the binding machine. The targeted binder strip is preferably disposed on the top position of a supply stack of binder strips located external to the binding machine.

The targeted binder strip is temporarily secured to the support arm as follows: (a) the thermal head temperature is increased by the thermal head controller to a temperature greater than the melting point of the binder strip adhesive; (b) the thermal head is brought into contact with the adhesive layer of the target binder strip when the support arm is moved to the strip contacting position thereby melting a small portion of the adhesive at the thermal head contact point and (c) the thermal head temperature is then reduced by the controller to below the adhesive melting point thereby resulting in an adhesive bond between the target binder strip and the thermal head and support arm. The support arm is then moved to the transport position so that the attached binder strip can be transported inside the binding machine and then released by again increasing the thermal head temperature. The support arm is then moved back outside the binding machine so that a further binder strip can be loaded if desired. Meanwhile the loaded binder strip is used by the binding machine to carry out a binding operation.

DETAILED DESCRIPTION OF THE INVENTION

Figure 1:
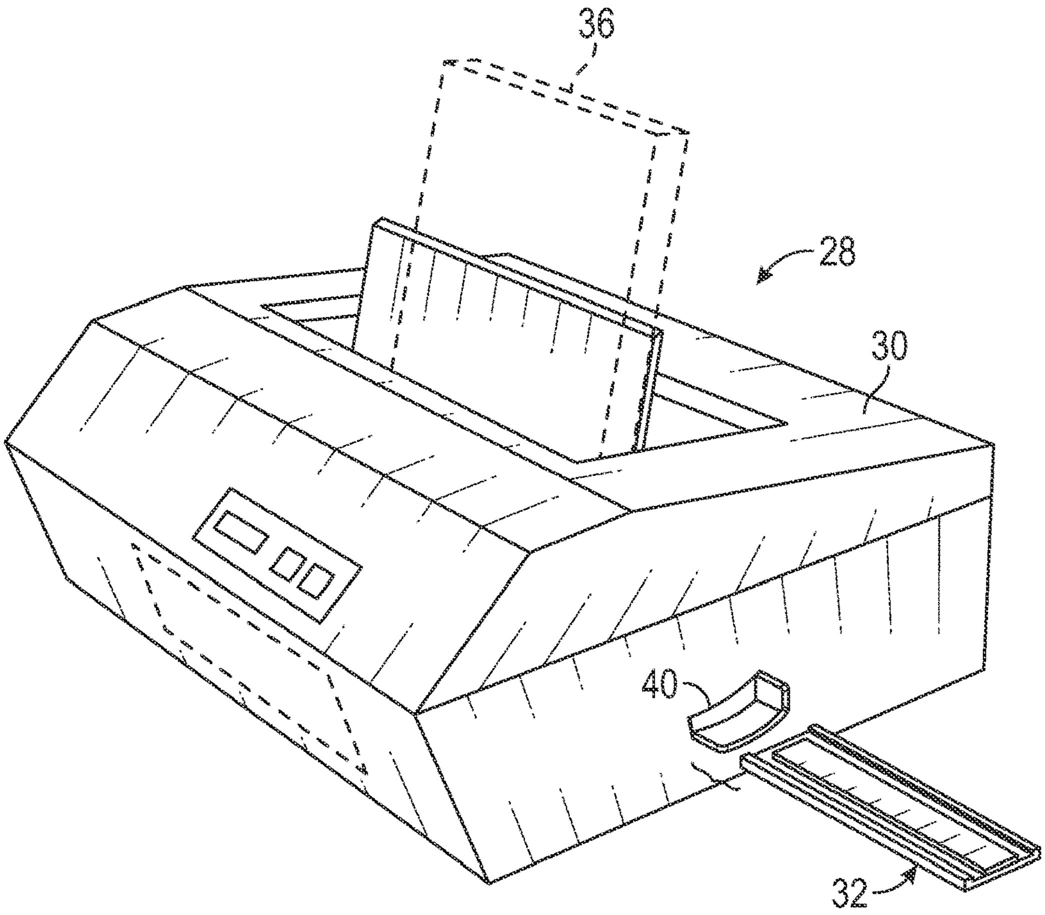
FIG. 1 (Prior Art)
FIG. 1 shows a conventional book binding machine.
Figure 2:
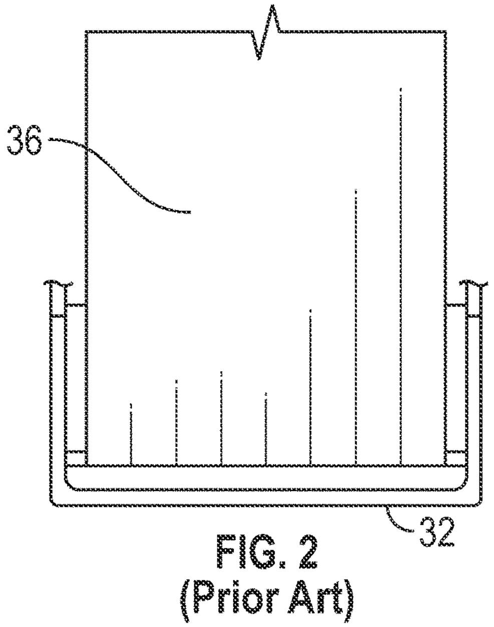
FIG. 2 (Prior Art)
FIG. 2 shows abound end of a stack of sheets using the FIG. 1 binding machine.
Figure 4:
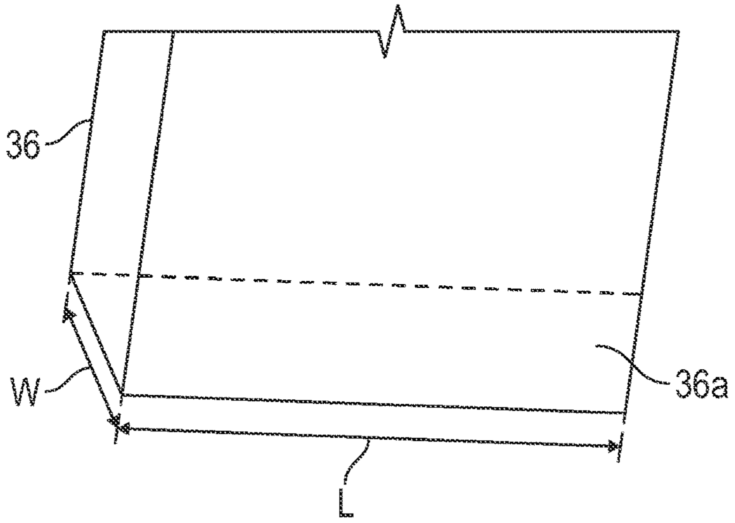
FIG. 4 (Prior Art)
FIG. 4 is a diagram of a conventional stack of sheets, where the binding end is designated by L×W.

Referring again to the drawings, FIG. 1 shows a conventional desk top book binding machine, generally designated by the numeral 28, as disclosed in the '873 patent, the contents of which have been fully incorporated herein by reference. The construction and operation of the binding machine is described in some detail in the '873 patent. As shown in FIG. 1, which is based upon FIG. 1 of the '873 patent, the binding machine has an upper opening for receiving a stack 36 of sheets to be bound. A binder strip 32, which a carries a heat-activated adhesive, is manually partially inserted in the machine 28 by way of opening 40. The machine then operates automatically draw the remainder of the strip into the machine and to then apply the binder strip 32 to the end of the stack 36 so as the bind the stack as shown in FIG. 2 which is based upon FIG. 4 of the '873 patent.

Figure 3:
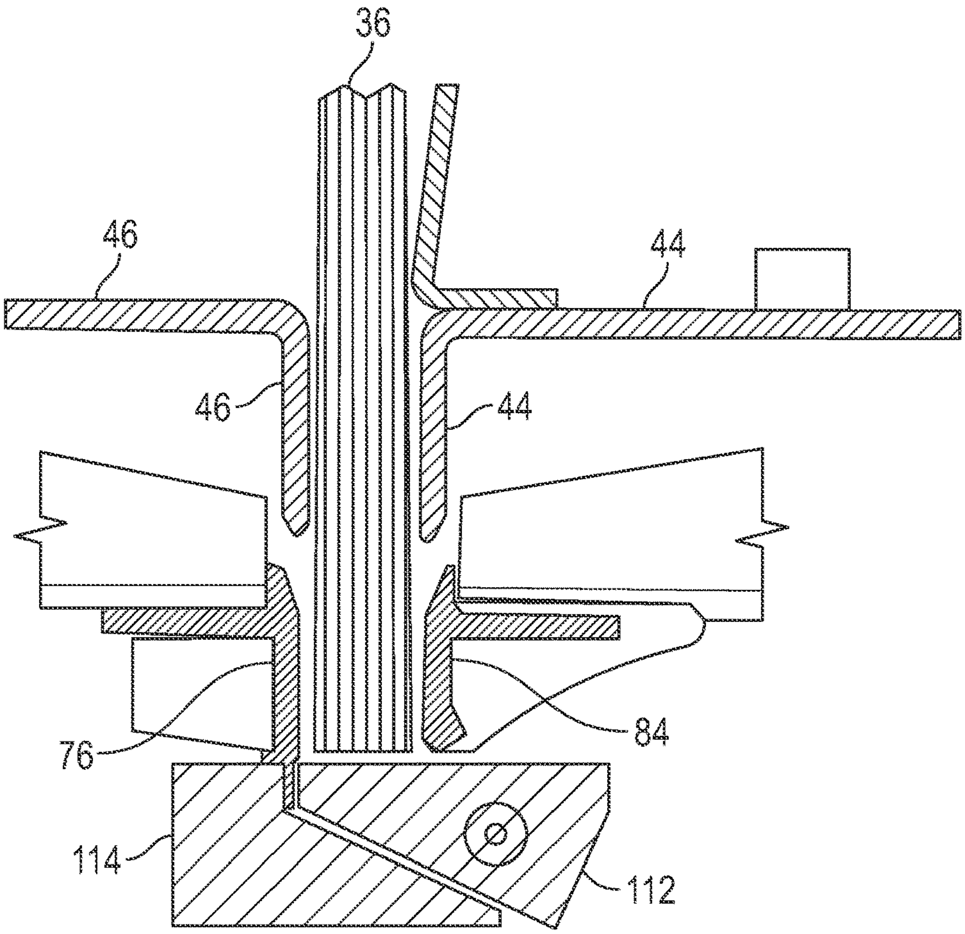
FIG. 3 (Prior Art)
FIG. 3 depicts selected components of the FIG. 1 prior art binding machine that may be additionally used to implement the subject abrading machine.

Some of the principal components of the binding machine 28 are depicted in FIG. 3 which is based upon FIG. 21 of the '873 patent except that the binder strip 32 has been deleted. A stack of sheets 36, to bound by a binder strip 32, is secured in place during binding by a pair of clamps 44 and 46. The binder strip 32 is wrapped around the binding end of the stack utilizing platens 112 and 114 which are heated to activate the binder strip adhesive. A pair of moveable backup bars 76 and 84 provide support to the end of the stack 36 during binding when pressure and heat is applied to secure one edge of the binder strip 32. By way of example, backup bar 76 provides support to the stack 36 when heated platen 114 applies heat and pressure to one edge of the binder strip to one side of the stack (see FIG. 18 of the '873 patent) adjacent to the binding end. Further, backup bar 84 provides support when platen 114 applies heat and pressure to the binder strip edge located on the opposite side of the stack (see FIG. 20 of the '873 patent). FIG. 3 herein shows the position of the heated platen 112 where it will be pressed against the central binder strip adhesive (not depicted) so heat and pressure will cause the adhesive to be applied to the binding end of the stack. As further described in the '873 patent platens 112,114 also manipulate the binding strip so that is secured to the front and rear cover sheets of the stack. The binding is completed when the bound stack is moved away from the heated platens 112,114 for cooling.

As previously described, various attempts have been made to deal with the binding sheets have coatings that prevent binder strip adhesives from adhering to the sheets. A radically different approach compared to the above-described prior art (see U.S. Pat. No. 7,677,855 previously fully incorporated herein by reference) has been used to achieve greatly improved binding results. A series of relatively blunt strikes to the binding end 36*a* of the stack, which are applied with a reduced force but relatively high pressure due to the small localized area of force application can result is a superior bind. The blunt strike operates to effectively crush the ends of the sheets thereby leaving small strands of paper fibers which operate to absorb the molten adhesive thereby greatly increasing the strength of the bind. Blunt strikes can be achieved using a striking device having a head diameter on the same order as the thickness of the individual sheets to be bound. Further, the production of paper dust is inherently greatly reduced. Repeated blunt strikes in the same general area on the binding end further significantly enhance of this improved abrading. This is compared to the forceful sharp strikes usually produced using prior art approaches which tends to cut and thereby reduce the amount of paper fibers thereby reducing the strength of the bind. The present approach provides reliable and strong binds, even for sheets having coatings of the type that have previously made adhesive binding very difficult.

Figure 5:
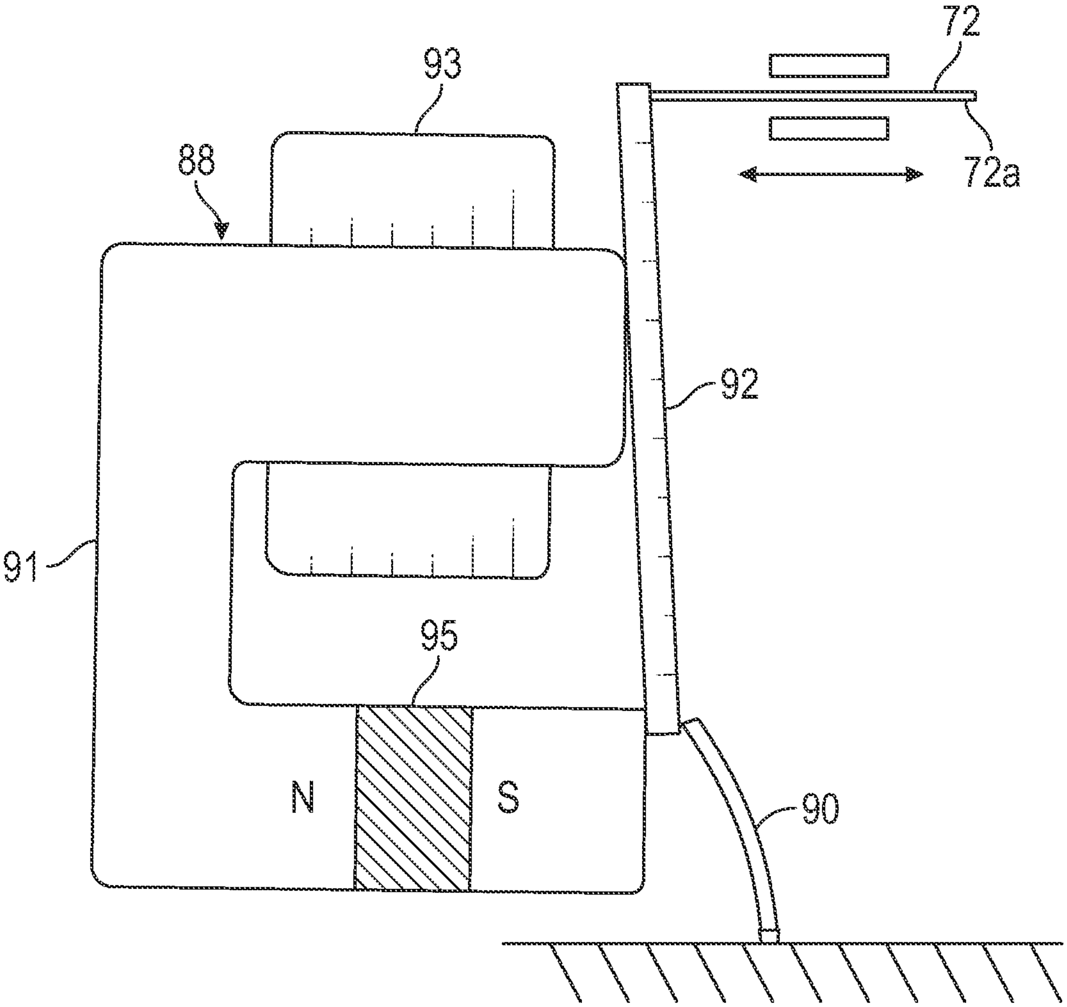
FIG. 5 (Prior Art)
FIG. 5 is a simplified diagram of the electromechanical drive for a single pin of a prior art dot matrix print head

Given that the typical thickness of coated sheets requiring abrading ranges from 0.005 to 0.008 inches and the area of the stack end to be bound is relatively large, and given that a preferred strike pin has a cylindrical shaped strike head having a diameter in the range of 0.008 inches, is can be seen a large amount of time may be required to carry out the abrading process. On the other hand, the process can be greatly speeded up by employing a multiple number of strike pins, driving the strike pins at a relatively high frequency or both. An abrading mechanism utilizing the application of high frequency strike pins having blunt heads is preferably implemented using a conventional dot matrix printer head. As is well known, a typical dot matrix printer head employs an array of printing pins, with each pin being driven by a solenoid. FIG. 5 shows a schematic diagram of a single pin, also referred to herein as a strike pin, 72 and associated permanent magnet type electromechanical driver 88 of a dot matrix printer head. Normally the pin 72 is in a retracted position as shown in the drawing, with a support arm 92 held in place against an armature by a permanent magnet 95, with a spring 90 being under stress. The pin 72 is driven when the electromagnet, including coil 93, is activated. The resultant magnetic field produced by the coil counters the field produced by permanent magnet 95. This causes the support arm 92 to be released thereby allowing the arm to shoot the pin 72 by the force of spring 90. Under normal circumstances, a strike head 72*a* of the extended pin 72 will strike an ink ribbon (not depicted) thereby causing a dot to be printed on an underlying sheet of paper. However, in the present application of the printer head, the strike head 72A of pin 72 is positioned to strike the binding end 36*a* of a stack of sheets being abraded as will be further described. Soon after the shrike, the coil is de-energized so that magnet 95 will pull the support arm back against the armature along with the strike pin 72. Note that many conventional dot matrix printer heads allow the striking force to be altered in order to allow simultaneous printing of multiple copies. This feature could be used optimize abrading for various paper types and thicknesses.

Figure 6:
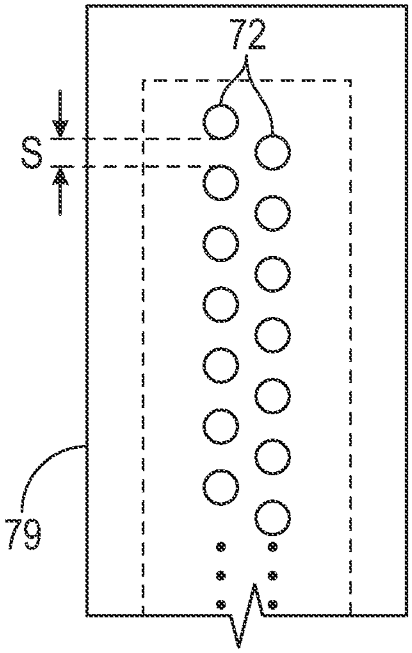
FIG. 6 (Prior Art)
FIG. 6 is a simplified diagram of part of a prior art print head showing some of the pins of a twenty-four pin array of two columns of twelve pins each.
Figure 7:
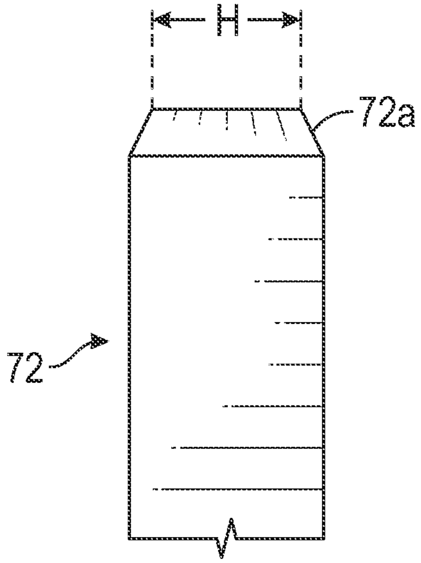
FIG. 7 (Prior Art)
FIG. 7 shows the striking head of a pin of a prior art printer head.

FIG. 6 is a diagram of an upper portion 79 of a typical dot matrix printer head 78 which will be sometimes be referred to herein as abrading head 78. A wide range of dot matrix printer heads can be used for this application although a printer head used in a dot matrix printer sold by Epson under the designation LQ590. Such print head has an array of twenty-four pins arranged in two columns of twelve performs well. As shown in FIG. 7, the circular shaped leading edge portion of a strike head 72*a* has a diameter H that is preferably about 0.008 inches, with a value of H ranging from 0.005 to 0.020 inches being suitable for this application. When operating, the pins are reciprocated between a retracted position and an extended position, with the pin typically extending about 0.010 inches from the head body in the extended position.

Figure 8:
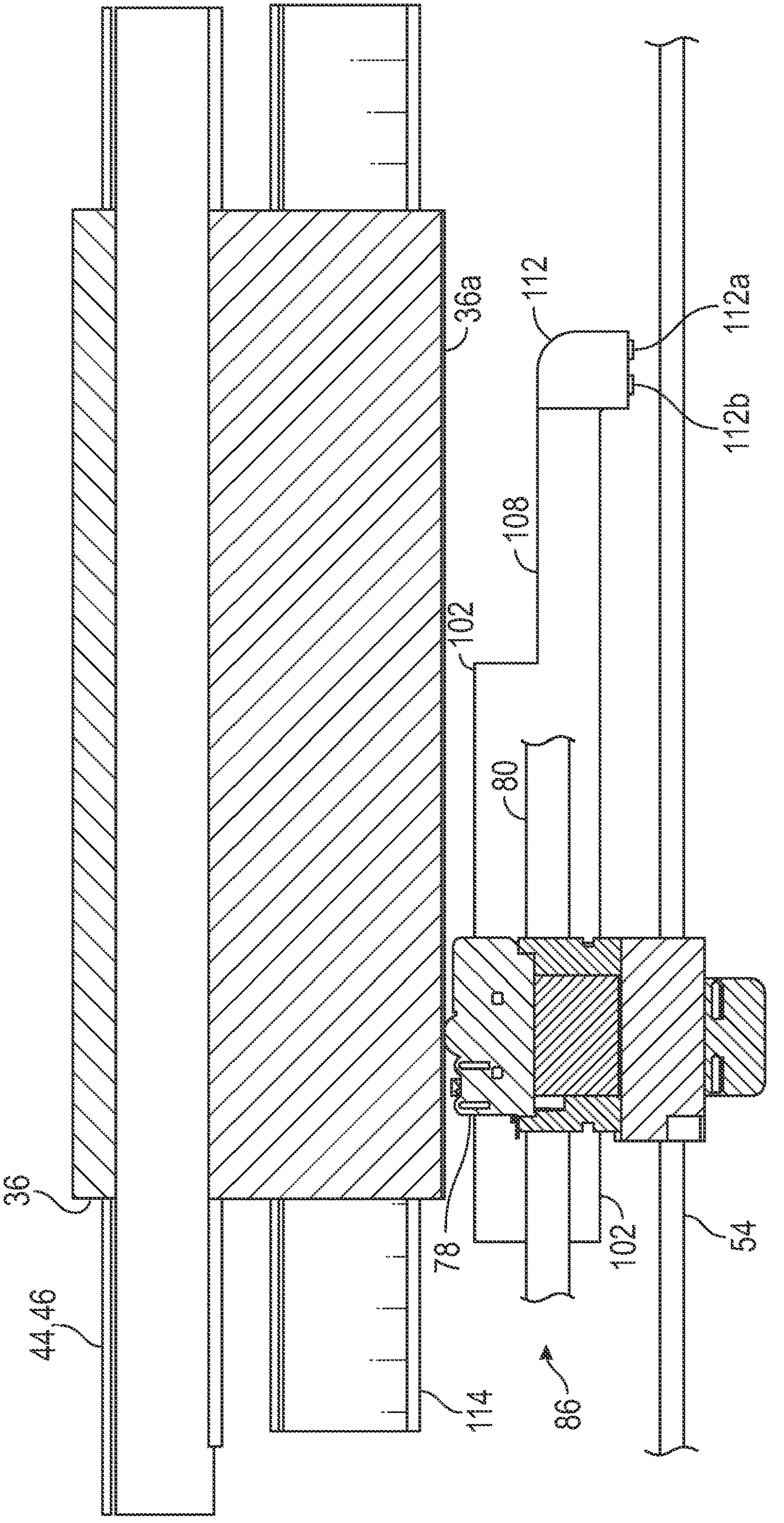
FIG. 8 is a side view of the subject abrading apparatus installed in a prior art binding machine.
Figure 9:
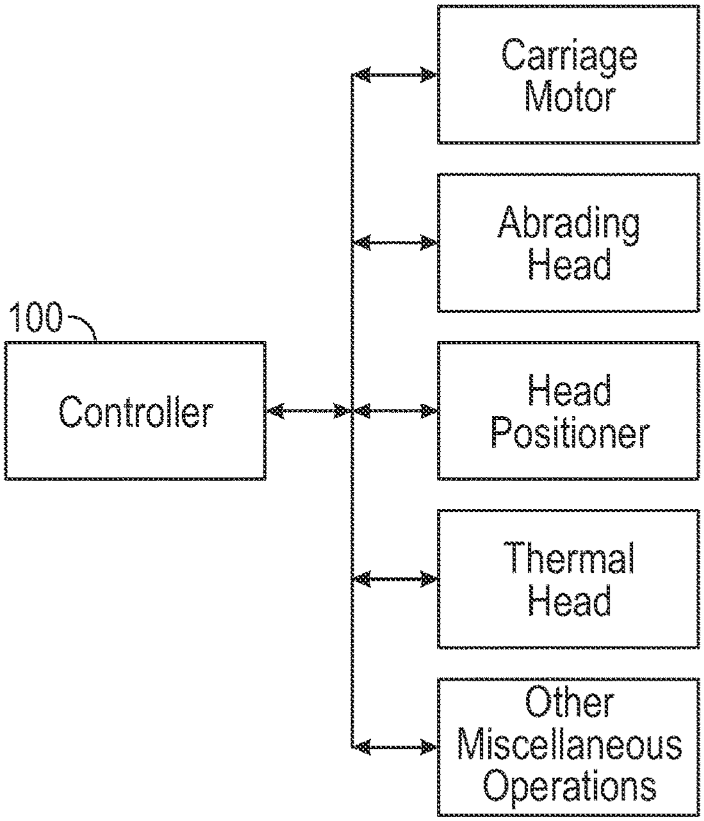
FIG. 9 is a block diagram of the controller for the subject abrading and a related binder strip loading apparatus.
Figure 10:
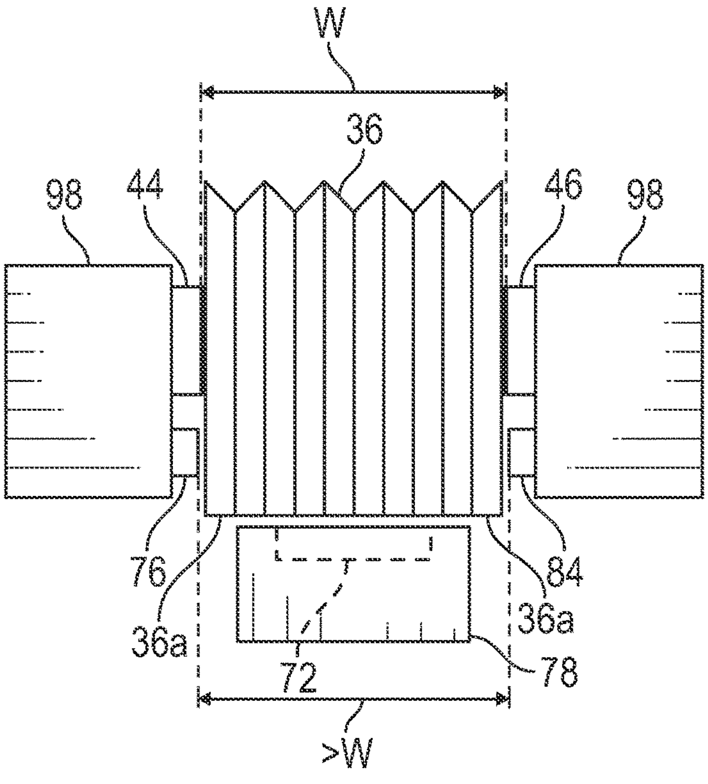
FIG. 10 is a simplified diagram of key elements of the subject abrading apparatus.

Preferably, the abrading head and associated hardware that make up the subject abrading apparatus, generally designated by the numeral 86, are installed within the housing 30 of a conventional book binding machine as represented schematically in FIGS. 8 and 10. The book binding machine is of the type previously described in connection with the '873 patent. The abrading head 78 is mounted on a mounting shaft 54 (FIG. 8), with a controller 100 (FIG. 9) controlling head movement along the length of the shaft using essentially the same control apparatus used by a conventional print head controller. Shaft 54 is mounted so that the abrading head 78 will be able to access the full area L×W (see FIG. 4) of the binding end of an stack 36 to be abraded. This is achieved by mounting the shaft within housing 30 adjacent to and parallel to the rotating platen 114 of the binding machine as shown in FIG. 7 of the '873 patent. As is the case for conventional dot matrix printers, the print head is driven back and forth along the mounting shaft by a drive belt. FIG. 8 shows a portion of a drive belt 80 for providing a similar function of driving the abrading head 78 back and forth along mounting shaft 54. Much of the control circuitry for the abrading head 78 is located on a printed circuit board 102, with the abrading head being mounted on the board so that the head and the circuit board move together along shaft 54. Additional control circuitry and power are provided to the board by way of a flexible cable (not depicted) which tracks the moving printed circuit board.

The first step in abrading a stack of sheets 36 is to position the stack between the open clamp members 44 and 46 and then pressing a commence button on the binding machine. This operation, much like that carried out at the beginning of binding, causes clamps 44 and 46 to close on the stack and firmly grip the stack at a location about 2 inches from the binding end of the stack. Thus, the spacing between clamps 44 and 46 is essentially equal to W (FIG. 10), the width of the stack. At the same time, a pair of backup bars 76 and 84 are caused to close around a portion of the stack intermediate that stack portion gripped by clamps 44 and 46 and the stack binding end 36*a*. In this position, the spacing between bars 76 and 84 is somewhat larger than W, with this increased spacing allowing the width of the binding end 36*a* of the stack to expand during abrading. If the spacing is constricted in this end region of the stack, the constriction interferes with proper abrading. Thus, the backup bars 76 and 84 do not grip the stack but rather contain and guide the expanded stack binding end 36*a*. In addition, subsequent to abrading, backup bars 76 and 84 can be used to compress the expanded abraded ends to allow a more attractive bind. FIG. 3 shows the position of the backup bars 76 and 84 that can be driven together to compress the binding end 36*a* after abrading. This compression can also be carried out during the normal binding process when a binder strip is present. It is preferred that about 0.030 inches of the stack binding end 36*a* be exposed below the backup bars 76 and 84 to provide access to the binding end 36*a* for the abrading head 78.

Figure 11:
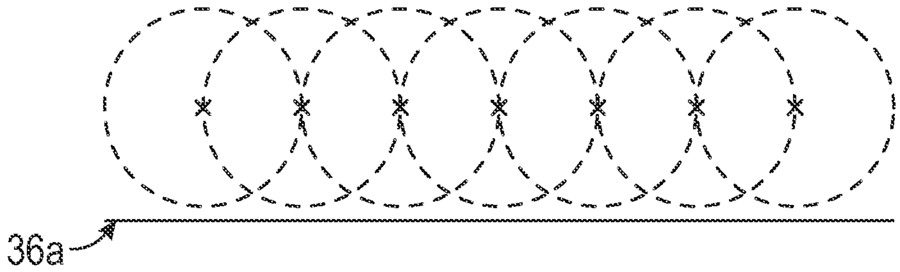
FIG. 11 depicts a sequence of overlapping impact regions created by a single pin on a binding end of a stack being abraded.

The abrading head 78, which includes twenty-four pins in this example, is positioned relative to the stack binding end so that the two columns of twelve pins are oriented normal to the length L (FIGS. 6 and 8) of the stack binding end 36*a* being abraded. FIG. 6, which shows only fourteen pins of the twenty-four, is not to scale where distance S between adjacent pins in a single column is actually typically only 0.002 inches. The total length of each of the columns is typically 0.125 inches. Preferably, all twenty-four pins are driven (reciprocated) together during abrading. FIG. 11 illustrates a series of sequential impact regions produced by a first single strike pin as the head 78 is driven along the length L of the stack binding end 36*a* while the head is being periodically actuated. It is preferred that the drive and actuation rates be such that there is an overlap between adjacent pin strikes as illustrated in FIG. 6. Note that a second pin in the same column immediately below that first pin will produce a similar series of impact regions immediately below those shown in FIG. 11 since, as previously noted, the spacing S is typically only 0.002 inches. Note also that, as shown in FIG. 6, the second column of pins is offset from those of the first column. This offset is such that the second column pins will produce impact regions that overlap the two adjacent impact regions produced by adjacent pins of the first column when the head is driven laterally as shown in FIG. 11. Thus, a single actuation (reciprocation) of all twenty-four pins of this exemplary abrading head will produce a relatively large total impact region s compared to the diameter H (FIG. 7) of the strike head 72*a* of the pins, which is typically 0.008 inches.

As previously noted, the abrading head 78 is driven along the length L of the binding end by belt 80 with the twenty-four strike pins all being periodically activated and deactivated at the same time. The pins are typically activated for a duration of 5 milliseconds. Moving the abrading head 78 laterally along the end of the stack 36*a*, in the L direction, at about 1.2 inches per second while activating the strike pins at about three hundred strikes a second provides excellent results. In addition, it is preferred that the stack be slightly oscillated in the normal W direction during abrading by way of clamps 44 and 46. Among other things, this oscillation functions to reduce the tendency of the strike pins to become entrained between the edges of the sheets of the stack. An oscillation having a peak-to-peak magnitude in the W direction of 0.020 inches for every 0.5 inches in the L direction provides a good result. Note that, as shown in the '873 patent, the binding machine functions to manipulate the position of clamps 44 and 46 in various ways to carry out a binding operation. One of ordinary skill would be able to slightly modify operation of the clamps in order to provide the above-described oscillation of these clamps. Also, in the event that the width W of the binding end is greater than the length of the head pin column, 0.125 inches, it will be necessary to again shift the stack using clamps 44 and 46 slightly so that the print head is position relative to the stack binding end 36*a* slightly in the W direction and then proceeding with passing the abrading head over an additional region of the binding end 36*a* along direction L.

Figure 12:
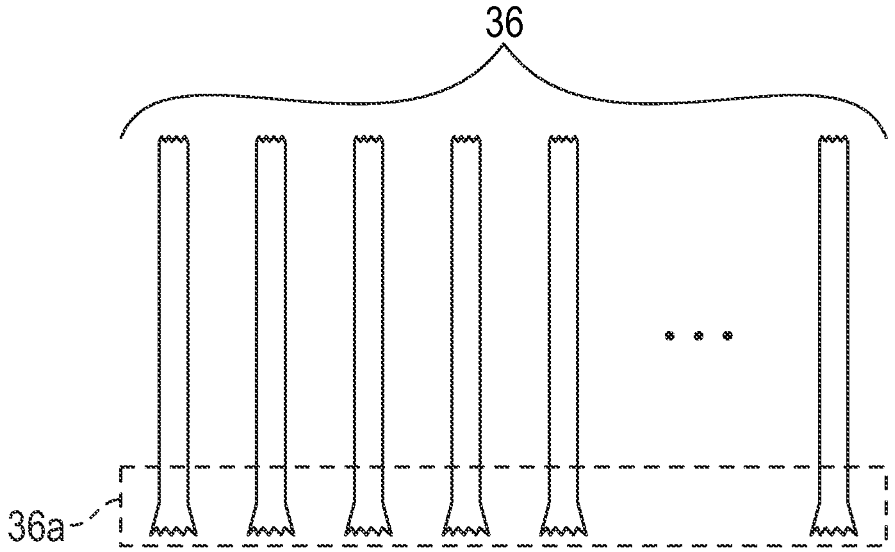
FIG. 12 shows the expanded abraded ends, in stylized form, of sheets of a stack after abrading by the subject abrading apparatus.

As previously noted, the impact of the relatively blunt, as compared to the thickness of most coated paper sheets, tends to crush, rather than cut, the edges of the sheets. This actions causes the ends of the abraded sheets to expand out as represented by the illustration of FIG. 12. These expanded sheet ends in the binding end 73*a* region of the stack, which contain a large amount of fiber strands, greatly enhance the ability of the sheet ends to absorb the molten binder strip adhesive thereby creating a strong binding. However, at some point the expansion should be limited since an overly thick binding end can result in an unattractive rounded binding. The spacing between the stack engaging surfaces of the backup bars 76 and 84 is selected to limit such expansion to a desired degree. In addition, the abraded stack end can be compressed, as previously described in connection with FIG. 3, using the backup bars.

As demonstrated here, the present abrading apparatus lends itself to being advantageously implemented, in part, using a conventional dot matrix print head. These print heads, when utilized as described herein, are capable of producing high frequency, overlapping strikes against the binding end using a strike head diameter that is relatively blunt as compared to the thickness of the sheets of the stack as is desired. Further, such printers are mass produced at a very reduced cost, particularly given the relative complexity of the devices. Further, the associated control mechanisms for these printer heads are well known in the art and thus such devices can be readily adapted for use in the present unrelated book binding technology as taught herein.

FIG. 10 is a simplified block diagram which symbolically represents the control mechanism for controlling operation of the abrading operation just described including controller 100. It should be noted that much of the control technology for controlling operation of the abrading head is similar, if not simpler, than the well known technology for controlling operation of print heads of conventional dot matrix printers. Similarly, the operation of the various book binding components to carry out this abrading process requires only minor modifications to existing controllers for carrying out conventional binding operations. Thus, a person of ordinary skill, based upon the present disclosure, would readily be able to implement the needed modifications to the existing control systems. Accordingly, further details of controller 100 are not provided here so as not to obscure the true nature of the present invention in unnecessary detail.

Figure 16:
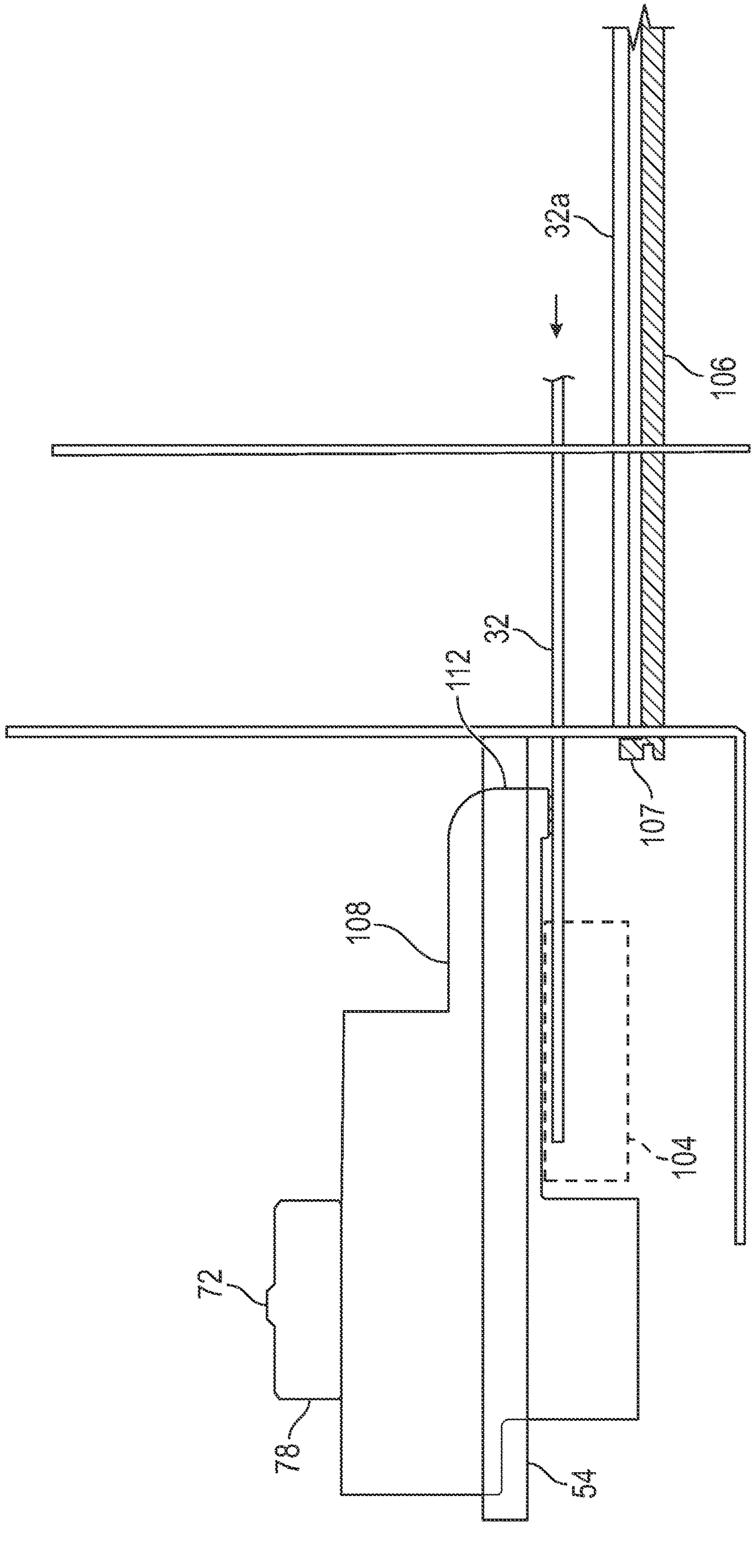
FIG. 16 shows a continuation of the FIG. 15 loading, with the end of the strip being positioned in a loading zone of the binding machine where the presence of the strip can be detected in order to initiate final loading.

Apparatus for loading binder strips into a binding machine is further disclosed. This loading apparatus may advantageously incorporate features that are part of the previously described abrading apparatus. In addition, features of the prior art binding machine disclosed in the '873 patent can be readily adapted. In many instances it is desirable to bind several identical or similar books in an assembly-line fashion. As described in detail in the '873 patent, when a stack is to be bound, the stack is manually inserted in the binding machine, such as binding machine 28 of FIG. 1, between the front and rear clamp members 44 and 46. The machine operates to automatically measure and display the thickness of the stack so that an operator can select a binder strip 32 of appropriate width: narrow, medium or wide. The operator then partially inserts a binder strip of appropriate width into the machine by way of an opening 40 in the housing. When the strip is partially inserted a sufficient distance into the housing so that the inserted and is detected by internal sensing apparatus, the binding machine will automatically draw the remaining portion of the strip into the binding machine. The actual binding of the strip will then commence. The apparatus for carrying this final loading operation is fully disclosed and described in the '873 patent (see FIGS. 10 and 22 therein and related discussion). The location in the binding machine where the manually inserted end of the strip is detected thereby causing the machine to automatically load the remainder of the strip is referred to herein as the loading zone. As described in the '873 patent such detection is carried out by strip sensors 180 and 184 (see FIG. 22 of '873 patent). The apparatus for accomplishing the loading zone function is represented by block 104 of the drawings (FIG. 16). Note the strip can also be fully loaded into the binding machine avoiding the need for the strip detection components associated with a loading zone and avoiding the need for the binding machine mechanism for pulling the remainder of the strip into the machine.

When carrying out an assembly line type operations where the same size of binder strips are to be used, it would be useful to provide some means to eliminate manually loading part of the binder strips as just described. However, it has been found that is difficult to mechanize the separation of a single strip from a stack of strips and to then load the separated strip into the machine. One source of the problem is that the presence of the heat-activated adhesive on the strips, which is slightly tacky even at room temperature, which makes it difficult to separate a single strip from a stack. The '873 patent utilizes a pair of pinch rollers (160/162 of FIG. 10 of the '873 patent) which are able to grip a single binder strip during for final loading of the strips. However, this approach is not helpful when multiple strips are positioned on top of one another in the form of a stack. If a single driven roller is applied under pressure to the upper strip of a stack of strips in an attempt to slide the upper strip away from the stack, the applied pressure, even if small, tends to cause the strips to stick together due to the presence of the slightly tacky strip adhesives. Thus, the strips do not reliably separate. These adhesive strip loading issues are overcome by the loading apparatus disclosed herein. Further, the present loading apparatus is amenable to advantageously utilizing certain aspects of the previously described abrading apparatus and the prior art binding machine.

As previously noted, the abrading head 78 is located on a printed circuit board 102 which contains much of the circuitry for controlling operation of the abrading head. The abrading head and circuit board move together laterally along shaft 54 in order to abrade the end 36*a* of a stack. As can best be seen in FIGS. 13A, circuit board 102 can be implemented to include an integral support arm 108 that extends away from abrading head 78 in a direction towards the opening 44 in housing 30 for receiving manually feed binder strips 32. A distal end of support arm 108 carries a thermal head 112 (FIG. 13B) which extends down from the support arm 108. The thermal head 112 includes a pair of spaced apart small electrical heating elements 112*a* and 112*b*. The two heating elements are aligned along an axis normal to the axis of the support arm 108 to secure a binder strip to be loaded, as will be described. The heating elements 112*a*/112*b* have a very low thermal mass so that the thermal head 112 can be brought up to an elevated operating temperature quickly after application of electric power and so that the temperature drops quickly after electric power is removed. A pair of spaced-apart size 080 33 ohm resistors have been found suitable for the two heating elements 112*a* and 112*b*. It takes approximately 50 to 100 milliseconds for these heating elements to go from room temperature to a fully heated state.

A binding strip cassette 106 is preferably provided for holding several binder strips 32 to be automatically loaded into the binding machine. Cassette 106 is provided with an end wall 106*a* and a single sidewall 106*b*, with the binder strips 32 being loaded into the cassette, adhesive side up, with one end of the strips being positioned adjacent end wall 106*a* and one edge of the strips being positioned adjacent the side wall 106*b*. The opposite side of cassette 106 is open so that strips of varying widths can be accommodated. Preferably, the cassette 106 can be temporarily attached to the binding machine housing 30, if auto loading is to be carried out, so that the strips are in proximity to the binder strip opening 44 of the binding machine.

Figure 13A:
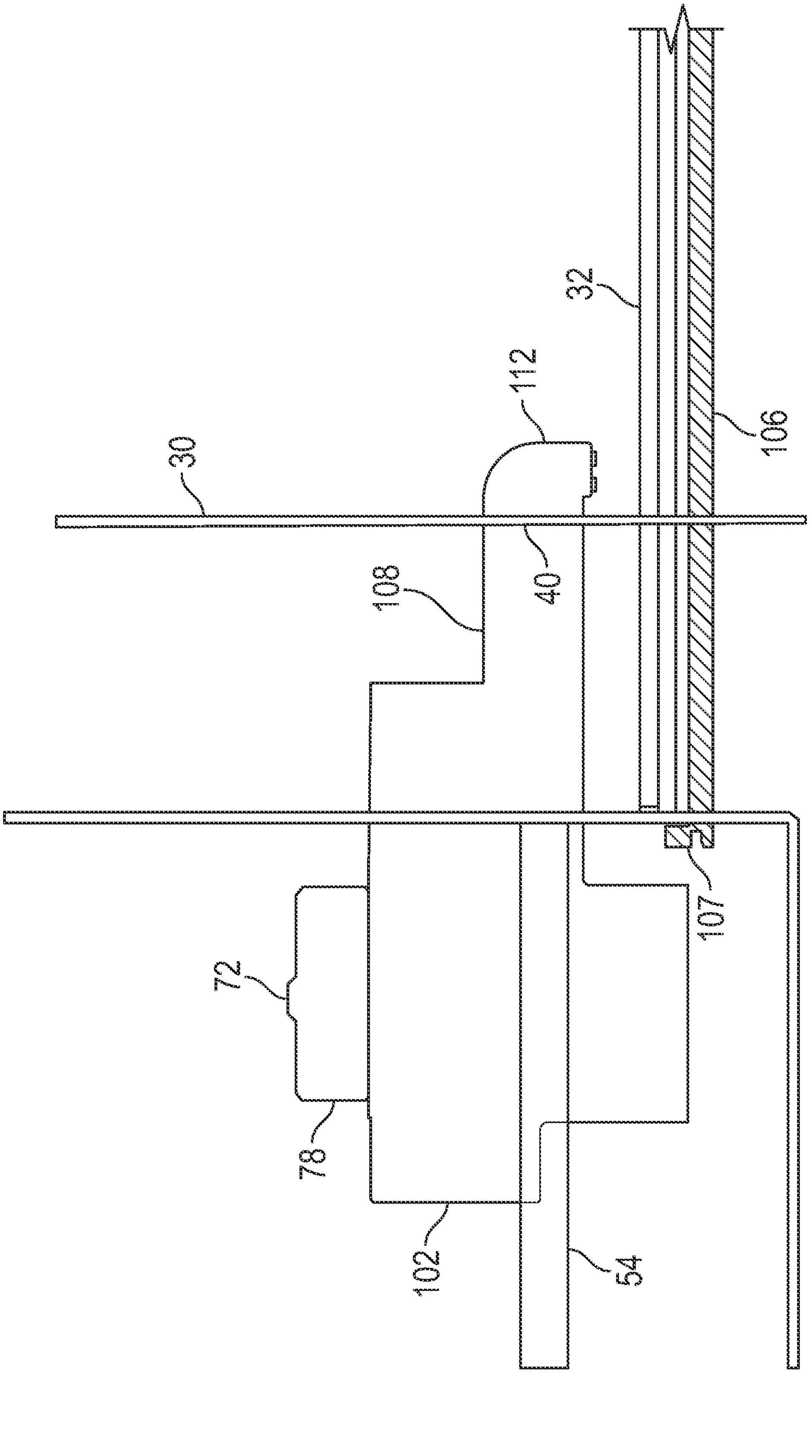
FIG. 13A shows a improve binder strip loading apparatus in accordance with one aspect of the present invention utilizing components of the subject abrading apparatus.
Figure 13B:
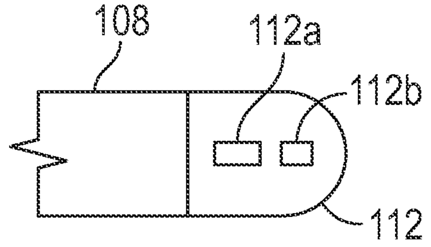
FIG. 13B shows a simplified diagram of a thermal head of the FIG. 13A loading apparatus.
Figure 14:
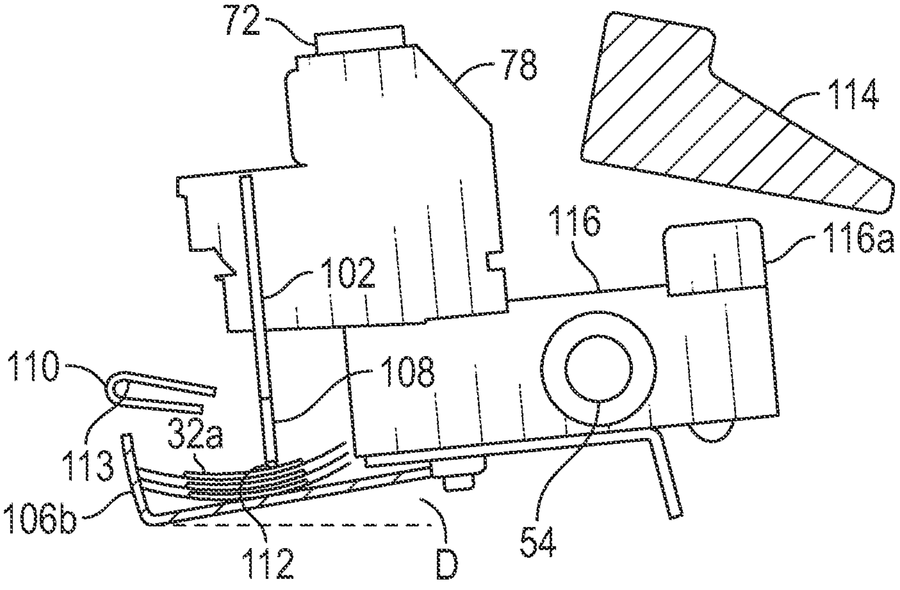
FIG. 14 is an end view of the FIG. 13A loading apparatus with a thermal head contacting a a top binder strip from a stack of strips present in a cassette to be loaded into the binding machine.
Figure 15:
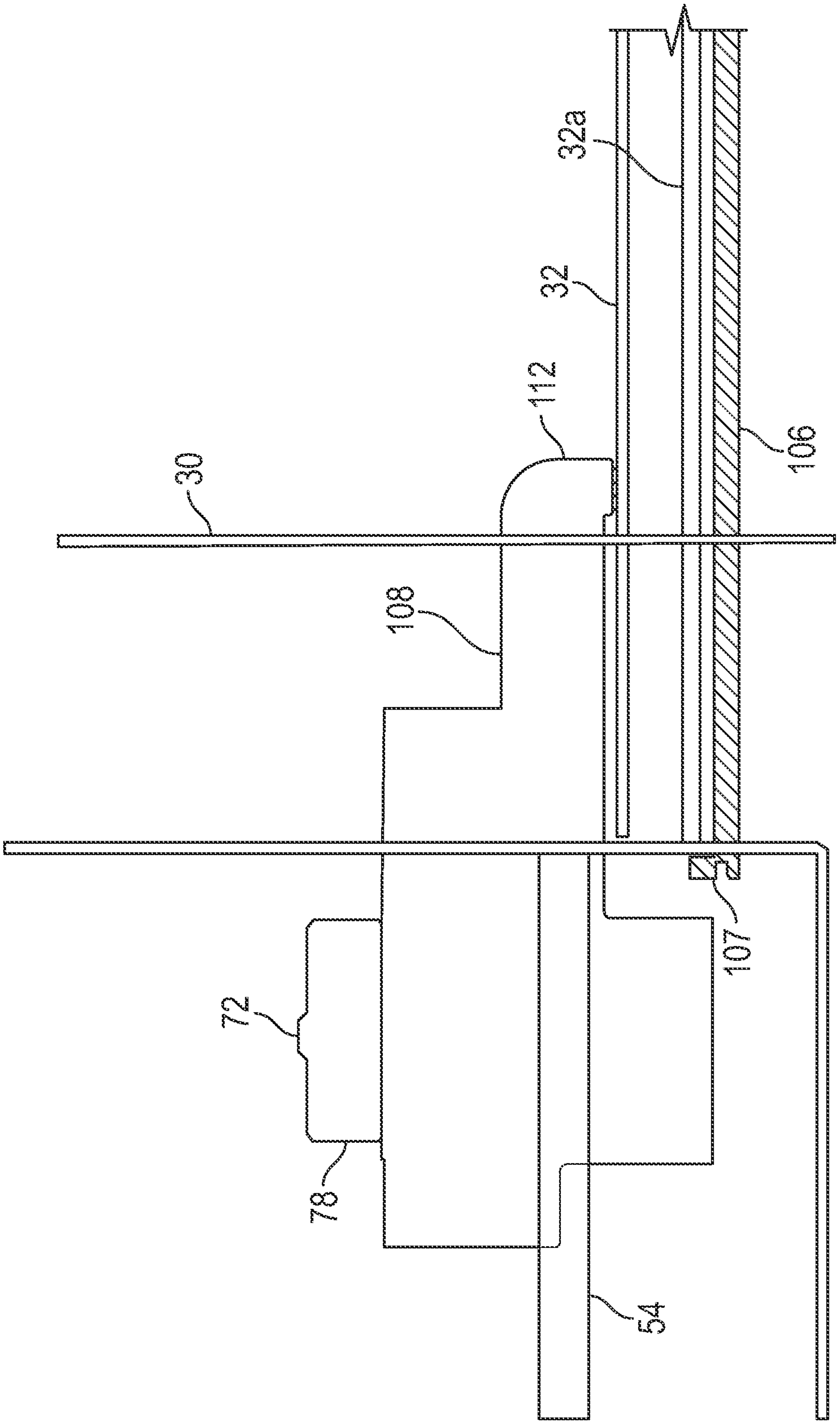
FIG. 15 shows the loading apparatus of FIG. 13A in the process of transferring a binder strip lifted from the cassette in to the binding machine.
Figure 17:
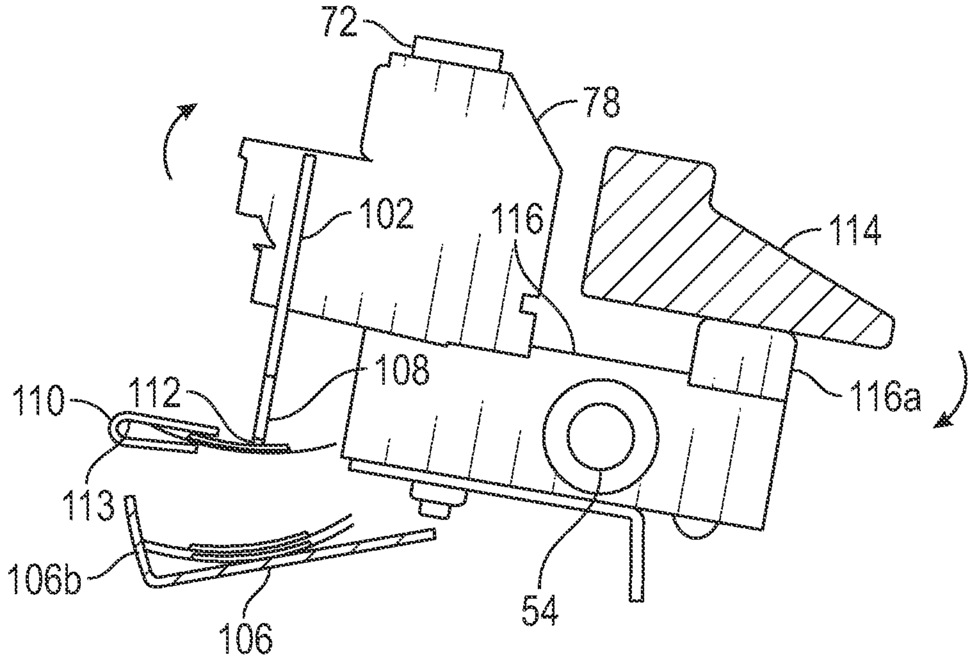
FIG. 17 is and end of the FIG. 15 loading sequence where the top binder strip has been lifted out of the cassette by tilting an extension arm carrying the thermal head and attached binder strip and transferring the strip to the binding machine loading opening for insertion into the opening.

FIGS. 13A and 15 are schematic representations, not to scale, side views of the binder strip loading apparatus in various stages of operation and FIGS. 14 and 17 are schematic representations of not to scale of end views of the loading apparatus in those various stages of operation. FIG. 13A shows a stack of same-size binder strips 32 to be used in sequential binding operations. The strips are loaded adhesive side up with the leading edge of the strips positioned against end wall 106*a* of cassette 106 and side wall 106A, with the sidewall not being depicted in FIG. 13A. Preferably, cassette 106 is positioned relative to and secured to the binding machine housing using a magnetic fastener 107. For reasons that will be explained, the cassette is tilted slightly from horizontal along a axis normal to the longitudinal axis of the binder strips. This tilting is shown as angle D in the end view of FIG. 14.

The strip loading process commences when the abrading head 78 and associated printed circuit board 102 are driven along mounting shaft 54 until the extension member 108 on board 102 carrying thermal head 112 are positioned over stack 32*a* of binder strips as shown in FIG. 13A. By this point thermal head 112 is caused to be heated temperature greater than the activation temperature of the binder strip adhesive. The printed circuit board 102 and associated components are pivotally mounted for rotation about the abrading head mounting shaft 54 by way of a pivot bar 116 as shown in FIG. 14. A rotational member 114 is positioned near one end of the pivot bar 116 so that the a contacting element 116*a* of the pivot bar can be selectively engaged in response to the rotational position of member 114. Preferably rotational member 114 is the heated platen 114 (see FIG. 3) used by the binding machine, as previously described, to assist in wrapping a binder strip around the end of a stack during binding. At the stage of the loading process depicted in FIG. 13A, the rotating platen 114 has been rotated from a position engaging contacting element 116*a*, thereby depressing the end of pivot bar 116 bar so that the opposite end of the bar carrying board 102 and extension member 108 is in a raised position over the binder strip stack 32*a* as indicated in FIG. 17. The platen 114 is then caused to rotate so the platen no longer engages contact element 116*a* as depicted in FIG. 14. This action permits the end of the pivot bar 116 carrying board 102 and thus thermal head 112 to drop onto the upper strip 32 of stack 32*a* by force of gravity. The heated thermal head 112 will possess a sufficient downward force such the spaced-apart heating elements 112*a* and 112*b* of the head will impact and slightly penetrate the heat activated binder strip adhesive. The thermal head 112 is then deactivated permitting the low thermal mass heating elements 112*a* and 112*b* to rapidly cool. This action results in a relatively strong, but temporary, physical bond between upper binder strip 32 and the extension member 108. Note that this downward force applied against the upper binder strip is insufficient to cause the adhesive of the underlying binder strip to become slightly tacky. Accordingly, the two upper binder strips will not tend to stick together when the upper strip is subsequently lifted.

As previously noted, the binder strip cassette is mounted on the binding machine so that it is slightly tilted as indicated by angle D. As a result, extension member 108 will not be exactly normal to the surface of the binder strips when the two elements are connected. As noted in the '873 patent (see col. 8, lines 61 et seq), a strip feed bar 110 includes a U-shaped generally horizontal slot 113 for receiving the lead end, and one edge, of a strip that is manually inserted into the binding machine. The feed bar includes a fluted opening (not depicted) to guide the strip as it is manually inserted into slot 113. The fluted opening provides a similar guiding function when auto feeding as described herein is carried out.

The engaged upper strip 32, as depicted in FIG. 14 must be lifted in order to remove the strip from the strip cassette 106. This is accomplished by causing the platen 114 to be rotated so that the platen engages the contact element 116*a* of the pivot bar 116 forcing the contact element down as shown in FIG. 17. This causes pivot bar 116 to pivot about mounting shaft 54 thereby lifting extension member 108 and the attached strip 32 up and along a slight arc. At the end of platen 114 rotation, the pivot bar contact 116*a* is depressed to a minimum value as shown in FIG. 17 so that the strip 32 will be level with feed slot 113. Note that the initial tilt D of the strip cassette 106 from horizontal, and thus the loaded binder strip, will tend to compensate for the subsequent tilting of the strip when the pivot bar 116 is pivoted about mounting shaft 54. Thus, the leading edge of the strip will be substantially aligned with the horizontal slot 113. The previously note fluting associated with slot 113 will tend to compensate for any remaining strip/slot misalignment. This loading state is also shown in FIG. 15, which does not depict the tilt.

The next step in the loading sequence involves controlling the abrading head 78 so that the head is moved away from the strip feed opening 40 thereby causing the attached extension member 108, along with the attached binder strip, to move along with it towards the strip opening (opening 40 in FIG. 13A) as depicted in FIG. 16. The strip continues to move the predetermined distance until the leading edge of the strip 32 is disposed in the binding machine loading zone 104. At this point the thermal head 112 is re-energized so the head and strip can be readily separated from one another for further strip loading. A previously described, when the strip end is in the loading zone 104, the presence of the strip end is detected by internal apparatus also used for manual strip loading. Upon such detection, the internal automated strip loading sequence commences which causes the strip to then be fully pulled into the machine as is also done for manual loading as described in detail in the '873 patent. During this final loading, the energized heating element is detached from the binder strip so that the abrading head 78 and connected extension member 108 can be moved to a location that does not interfere with the subsequent conventional binding process.

As previously noted it would be possible to eliminate the need for the binding machine components associated with loading zone 104 and the components associated with drawing the remainder of the strip until the strip is in a fully loaded state. In that event the extension member 108 continues to draw the strip further into the machine past the point show in FIG. 16. Once the strip is fully loaded, the thermal head is activated so that the fully loaded strip is released.

Note that the control mechanism 100 of FIG. 9 operates translate the abrading head back and forth along shaft 54 to move abrading head 78 and connected elements such as extension member 108 as previously described. This lateral movement is also typical of movement of the print head of a conventional dot matrix printer. The movement of platen 114 to depress and release the pivot bar 116 requires only a minimal change to the controller for carrying out more complex movement of the platen during normal binding operations. For these reasons it is submitted that one of ordinary skill, given the present disclosure, would be able to easily implement the control mechanism for the disclosed binder strip loading mechanism. Thus, details regarding such control mechanism have not been disclosed herein so as to not obscure the true nature of the invention in unnecessary detail.

Thus, various embodiments have been disclosed involving improvements in book binding. Although these embodiments have been described in some detail, various changes can be made by those skilled in the art without departing from the spirit and scope of the invention as defined by the appended claims.

What is claimed is:

1. A binding machine comprising an apparatus for loading adhesive binder strips into the binding machine, said apparatus comprising:
- a thermal head;
- a thermal head controller configured to alter a temperature of the thermal head;
- a support arm which supports the thermal head;
- a support arm positioner configured to move the support arm between a binder strip contacting position wherein the thermal head can contact a binder strip to be loaded into the binding machine and a binder strip transport position wherein a binder strip carried by the support arm can be inserted at least partially into the binding machine where the inserted binder strip can then be applied to the binding end of a stack to be bound.

2. The apparatus of claim 1 wherein the thermal head includes at least two spaced-apart heating elements.

3. The apparatus of claim 1 wherein the support arm positioner is further configured to cause the support arm to pivot about a pivot axis when the support arm is moved between the contacting position and the transport position.

4. The apparatus of claim 3 wherein the binding machine includes an abrading head mounted in common with the support arm.

5. The apparatus of claim 1 wherein the thermal head controller functions to alter a temperature of the thermal head so that a binder strip can be secured to the mounting shaft by first positioning the thermal head against an adhesive of the binder strip when the support arm is in the contacting position, with the thermal head being at an elevated temperature and then reducing the temperature so as to form an adhesive bond between the thermal head and the binder strip.

6. The apparatus of claim 5 wherein the thermal head controller functions to increase the temperature of the thermal head after the at least partial insertion so that the adhesive bond is broken thereby releasing the binder strip.

7. The apparatus of claim 1 wherein the thermal head includes at least two spaced-apart heating elements, with each of the heating elements comprising a discrete resistor.

8. The apparatus of claim 1 wherein the binding machine includes an abrading head for abrading a binding end of a stack of sheets to be bound and an abrading head mounting shaft along which the abrading head moves and wherein the support arm positioner moves the support arm on the abrading head mounting shaft when the support arm is in the binder strip transport position.

9. The apparatus of claim 1 wherein the support arm positioner operates to cause the support arm, when in the transport position, to carry an attached binder strip only partially into the binding machine at which point the thermal head controller can cause the thermal head to release the attached binder strip thereby allowing further binding machine apparatus to move the released binder strip to a fully loaded position.

10. The apparatus of claim 1 wherein the support arm positioner operates to cause the support arm, when in the transport position, to carry an attached binder strip into the binding machine to a fully loaded position at which point the thermal head controller can cause the thermal head to release the attached binder strip.

11. Apparatus for loading adhesive binder strips into a binding machine, wherein the binding machine includes an abrading head positioner, said apparatus comprising:
- a thermal head;
- a thermal head controller configured to alter a temperature of the thermal head;
- a support arm which supports the thermal head;
- a support arm positioner configured to move the support arm between a binder strip contacting position wherein the thermal head can contact a binder strip to be loaded into the binding machine and binder strip transport position wherein a binder strip carried by the support arm can be loaded into the binding machine where the loaded binder strip can then be applied to the binding end of a stack to be bound and wherein the support arm positioner utilizes at least part of the abrading head positioner when the support arm is in the transport position.

12. The apparatus of claim 11 wherein the thermal head includes at least two spaced-apart heating elements.

13. The apparatus of claim 11 wherein the support arm positioner is further configured to cause the support arm to pivot about a pivot axis when the support arm positioner is moved to carry out an abrading operation on a stack of sheets between the contact position and the transport position.

14. The apparatus of claim 11 wherein the binding machine includes an abrading head mounted on an abrading head mounting shaft along which the abrading head moves to carry out an abrading operation on a stack of sheets and wherein the support arm positioner utilizes the abrading head mounting shaft when the support arm is in the transport position.

15. The apparatus of claim 11 wherein the thermal head controller functions to alter a temperature of the thermal head so that a binder strip can be secured to the mounting shaft by first positioning the thermal head against an adhesive of the binder strip when the support arm is in the contacting position, with the thermal head being at an elevated temperature and then reducing the temperature so as to form an adhesive bond between the thermal head and the binder strip.

16. The apparatus of claim 11 wherein the support arm positioner operates to cause the support arm, when in the transport position, to carry an attached binder strip into the binding machine to a fully loaded position at which point the thermal head controller can cause the thermal head to release the attached binder strip.

17. The apparatus of claim 11 wherein the support arm positioner operates to cause the support arm, when in the transport position, to carry an attached binder strip only partially into the binding machine at which point the thermal head controller can cause the thermal head to release the attached binder strip thereby allowing further binding machine apparatus to move the released binder strip to a fully loaded position.

18. A binding machine comprising an apparatus for loading adhesive binder strips having a temperature-activated adhesive into a binding machine, said apparatus comprising:

a thermal head;

a thermal head controller configured to alter a temperature of the thermal head to an elevated temperature above a melting point of the binder strip adhesive and a reduced temperature below the melting point of the binder strip adhesive;

a support arm which supports the thermal head;

a support arm positioner configured to move the support arm between a binder strip contacting position wherein the thermal head can contact a binder strip to be loaded into the binding machine and binder strip transport position wherein a binder strip carried by the support arm can be inserted at least partially into the binding machine where the binder strip can then be applied to the binding end of a stack of sheets to be bound and wherein the thermal head controller functions to set the thermal head to the elevated temperature and then to the reduced temperature while the support arm is in the binder strip contacting position so as to form an adhesive bond between the support arm and the contacted binder strip and to then set the thermal head to the elevated temperature to break the adhesive bond when the support arm is at least partially inserted into the binding machine.

19. The apparatus for loading of claim 18 wherein the binding machine includes an abrading head and an associated abrading head positioner for abrading an end of a stack of sheets to be bound, wherein the abrading head and the support arm are mounted in common and wherein the support arm positioner causes the support arm to be rotated when the support arm is transitioning between the binder strip contacting position and the transport position.

* * * * *